3,779,982
DIELECTRIC LAYER COMPOSITION
Carolyn J. Camp, Livermore, and Robert O. Lindblom, Walnut Creek, Calif., assignors to The Dow Chemical Company, Midland, Mich.
No Drawing. Filed Aug. 19, 1971, Ser. No. 173,299
Int. Cl. C08f *45/04;* C08g *45/04*
U.S. Cl. 260—41 R          6 Claims

ABSTRACT OF THE DISCLOSURE

A dielectric layer for use on electroconductive papers, particularly at relatively high humidities, consisting of 15 to 85 volume percent of a copolymer of vinylidene chloride and at least one other olefinically unsaturated monomer, 8 to 77 volume percent of an epoxy resin having an epoxy equivalent weight between 400 and 60,000, and, optionally, 0 to 42 volume percent of a pigment.

BACKGROUND OF THE INVENTION

Electrographic paper for use in electrostatic printing, said paper being formulated to look like ordinary paper, consists of a paper substrate generally made conductive by the addition of electroconductive resins or salts, on the top of which is placed a highly resistive dielectric resin coating. Generally these papers contain a pigment, the purpose of which is to reduce the gloss of the polymer coating and to give the paper a flat, matte-type finish. The resulting paper can be of any size, depending upon the requirements of the machine.

In a typical printing process, the paper is passed through an electrographic printer. Voltage in the range of 500–900 volts is applied across the dielectric coating. One process has an electrode making contact with the electroconductive substrate, and the other electrode, consisting of styli which are selectively activated by programmed impulses, is in proximity with, but not touching, the dielectric coating. An electrical discharge occurs across the air gap, resulting in an electrostatic image on the surface of the paper.

An alternative process charges the dielectric layer through one stylus, with the return path through another electrode on the same side of the paper.

The dielectric layer functions as a charged capacitor, the charged paper then being passed through a toner containing oppositely charged particles. The particles adhere to the electrostatic image, resulting in a visible print.

There are many dielectric materials which, when coated on paper, will accept a static charge and produce a toned image at about 50% room humidity. Any fairly good dielectric will hold sufficient charge long enough to be toned out in a few minutes to produce a visible print.

But when the coated papers are run through high speed printers (5800 lines per minute) and when the humidity to which the paper is subjected begins to vary over a range of 10 to 85 percent, each component of the electrographic system begins to have critical requirements.

At low humidity the conductvity of the base sheet must be provided solely by the electroconductive resin with which it is impregnated. Conductvity of the base sheet determines the time required to transfer charge to the dielectric. The dielectric coating must be capable of being charged in a matter of about 50 microseconds. As the humidity goes up to 80 percent and higher, other problems become paarmount. For instance, the papers begin to exhibit curl problems and the charge leaks off and through the paper much more quickly. In addition, parts of the dielectric coating lose their dielectric strength and break down at voltage levels which are inadequate for printing.

Past experience has shown that many soft resins, such as vinylidene chloride copolymers, while they do not curl, will not receive and maintain an electrical charge under high humidity conditions. On the other hand, while many hard resins, such as epoxy resins, will receive and maintain a charge, they exhibit excessive curl under these conditions.

SUMMARY OF THE INVENTION

Dielectric coatings have now been found which have desirable properties when said coatings and their associated substrate are exposed to relatively high humidities, i.e., above about 50%.

The coatings of this invention exhibit desirable dielectric properties under said conditions, i.e., they exhibit (1) good charging characteristics, (2) good charge retention characteristics, and (3) the ability to withstand changes in the dimensions of the substrate.

The coatings of this invention consist essentially of 15 to 85 volume percent, preferably 32 to 58%, of a copolymer of vinylidene chloride and at least one other olefinically unsaturated comonomer polymerizable therewith; 8 to 77 volume percent, preferably 24 to 50%, of an epoxy resin having an epoxy equivalent weight of about 400 to 60,000; and, optionally, 0 to 42 volume percent, preferably 10 to 25%, of a pigment.

The coating may be placed on one or both sides of an electrographic paper by known techniques, i.e., impregnating, padding, dipping, spraying, coating, or the like, in an amount effective as a dielectric layer, resulting in papers suitable for use in electrostatic printing processes. For instance, a coat weight of about one to fifteen pounds per ream (3,000 ft.$^2$), preferably about 3 to 6 pounds per ream, is generally suitable. The approximate optimum volume ratio of components for use herein at high relative humidities, i.e., above about 50%, is about 49% copolymer, about 37% epoxy resin and about 14% pigment.

DETAILED DESCRIPTION OF THE INVENTION

Copolymers suitable for the practice of the present invention include copolymers of vinylidene chloride containing at least about 70 weight percent, preferably about 80%, but less than about 96% vinylidene chloride and at least one other olefinically unsaturated monomer copolymerisable therewith.

Among the myriad of suitable ethylenic comonomers are substituted and unsubstituted styrenes of the formula

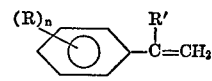

wherein each R and R' is, independently, H, Cl, Br, F or a straight or branched-chain alkyl group of up to 8 carbon atoms (such as methyl, propyl, butyl or octyl), and *n* is 0 to 5. Examples include o-, m- and p-methyl styrenes; alpha-methyl styrene; 2,3-, 2,4- and 2,5-dimethyl styrenes; alpha-cholorostyrene; alpha-ethyl styrene; o-, m- and p-bromo-, chloro- or fluorostyrenes; isopropenyl toluene; 2,3-, 2,4- and 2,5-dichloro-, dibromo- and difluorostyrenes; and the like.

Also suitable are vinyl naphthalene; methacrylonitrile; acrylonitrile; 2-chloroacrylonitrile; vinylchloride; acrylate and alkylacrylate esters, such as methyl acrylate, ethyl acrylate, n-butyl acrylate, isobutyl acrylate, 2-ethyl-hexyl acrylate, dodecyl acrylate, 2-chloroethyl acrylate, 2-hydroxy-ethyl acrylate, 2-hydroxy-propyl acrylate, 2-chloropropyl acrylate, 2,2′-dichloro-isopropyl acrylate, phenyl acrylate, cyclohexyl acrylate, methyl alpha-chloroacrylate, methyl methacrylate, ethyl methacrylate, 2-sulfo-ethyl methacrylate and methyl ethacrylate; vinylidene cyanide; vinyl esters, such as vinyl acetate, vinyl chloroacetate, vinyl propionate, vinyl butyrate, vinyl laurate and vinyl stearate; vinyl ethers, such as vinyl methyl ether and vinyl isobutyl ether; vinyl ketones, such as vinyl methyl ketone, vinyl hexyl ketone and methyl isopropenyl ketone; isobutylene; 1-butene; vinylidene halides, such as vinylidene chlorofluoride; N-vinyl compounds, such as N-vinyl pyrrole, N-vinyl carbazole, N-vinyl indole and N-vinyl succinimide; acrolein, methacrolein; acrylamide; methacrylamide; N-methylol acrylamide; allyl compounds, such as allyl alcohol, methallyl alcohol, allyl acetate, allyl methacrylate, allyl lactate, allyl alpha-hydroxyisobutyrate, and allyl acrylate; and the like.

Copolymers which are suitable herein have a molecular weight which is described by a relative viscosity of between about 1.2 and 3.5, preferably 1.6 to 3.0, for a 1% tetrahydrofuran solution at 25° C. as determined by ASTM Test D1243–60.

Preferred copolymers include those which are 75 to 95% vinylidene chloride and 5 to 25% vinyl chloride or acrylonitrile.

Suitable epoxy resins are those which have an epoxy equivalent weight of about 400 to 60,000 and are generally defined by the following formula:

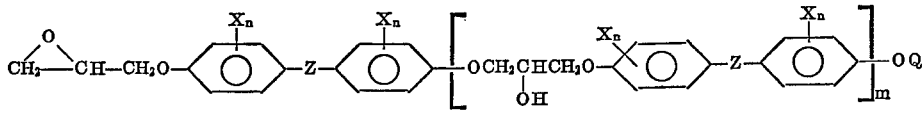

wherein each —Z— is a chemical bond,

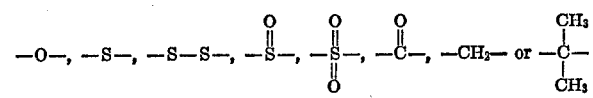

Q is

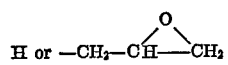

each X is Cl or Br; each $n$ is 0 to 2; and $m$ is about 1 to 210.

These resins are generally formed by the reaction, in the presence of a suitable catalyst, of a bisphenol and a diglycidyl ether of a bisphenol or an epihalohydrin in a ratio such that a product with an epoxy equivalent weight of about 400 to 60,000 is formed, this mode of preparation being well known to the art.

Preferred epoxy resins are those wherein Z is isopropylidene, Q is 2,3-epoxypropyl and the epoxy equivalent weight is between about 800 and 6,000.

Pigments known to the art to be useful when incorporated into dielectric coatings are suitable herein. As an example, the following may be used: white leads (such as basic carbonates, sulfates and silicates), zinc oxides (such as acicular, nodular and 35% leaded), titanium dioxides (such as rutile, anatase and 30% $TiO_2$/70% $CaSO_4$), silicas (such as amorphour, diatomaceous, magnesium silicate talc, aluminum silicate China clay, mica, bentonite, wollastonite and lorite), lithopone, zinc sulfide, antimony oxide, barium sulfate, calcium carbonate, ground limestone, toluidine and red toner, hansa yellow, chrome yellow, phthalocyanine green or blue, molybdate orange, dinitraline orange toner, carbon black, and the like. Other pigments which could be substituted for the above will be obvious to those in the coating arts. Lithopone is the preferred pigment for use in the dielectric coating when a pigment is used.

The above coatings may suitably be prepared by dissolving the copolymer and epoxy resin, in any sequence, in a suitable solvent in the desired ratio. A pigment, if desired, may be dispersed into the solution by known techniques, such as sand milling. Ambient conditions are generally suitable for the above process.

Suitable solvents include ketones, such as methyl ethyl ketone, acetone, cyclohexanone and isophorone; and tetrahydrofuran, dimethylformamide, ethyl acetate, and the like.

SPECIFIC EMBODIMENTS

Example 1

To 160 ml. of methyl ethyl ketone in a wide-mouth bottle equipped with a magnetic stirrer was added 40 gm. of a copolymer of 80% vinylidene chloride and 20% of acrylonitrile, said copolymer having relative viscosity of 2.57 in a 1% solution of tetrahydrofuran at 25° C. The solution was stirred for one hour, and then 10 gm. of an epoxy resin of the above formula wherein $n$ is 0, Z is isopropylidene and the epoxy equivalent weight is about 1800, was added, the stirring continued for another hour. 40 gm. of lithopone pigment was then added, and sand-milled (20–30 mesh milling sand) at 3700 r.p.m. for about 15 minutes. The sand was separated by filtering the coating/milling sand mixture through a conical paper paint filter.

The above mixture was then applied to a conductive-base paper of 133 megohms/☐ by the use of wire-wound rod, typically a #18 rod. However, the rod size and solids content of the mixture were both varied to control the holdout from the paper and the coating weight.

Films were used with coating weights of from 3 lbs. to 14 lbs./ream. Commercial films are typically 5 lbs./ream, but lab samples are usually less perfect due to batch-wise coating, and somewhat heavier films were necessary to achieve comparable dielectric strength and charge retention.

The samples were evaluated by charging the dilectric film with 600 volts against an etched halftone magnesium test plate. A high impedance 600 volt power supply had the negative lead connected to the test plate and the positive lead connected to a piece of foil. The paper was interposed between the plate and the foil, the dielectric side facing the plate. Intimate contact was achieved by the use of a rubber roller.

The electrostatic image thus achieved was converted into an optical image by the use of a commercially available liquid toner.

Charge acceptance and retention was measured by a Most Associates Stati-Tester. To measure charge retention, the charged paper was placed in the machine where it was given a charge by corona discharge. Subsequent to the charging period, the machine measured the surface charge ($V_o$) with an electrometer. The machine then measured surface charge two minutes later (V). The paper was thusly tested under ambient humidity conditions (~35%) and at 85% relative humidity.

The table below summarizes this data for various coat weights and different ratios of polymer and epoxy. The pigment used was lithopone, the amount used being shown in the table. The coat weights given are approximate, it being understood that variations in coat weight will result in variations in results.

TABLE I

| Example number | Volume percent | | | 5 lbs./ream [a] | | | | 8 lbs./ream [a] | | | |
|---|---|---|---|---|---|---|---|---|---|---|---|
| | Polymer | Epoxy | Pigment | 35% R.H. | | 85% R.H. | | 35% R.H. | | 85% R.H. | |
| | | | | $V_o$ | $V_o/V$ | $V_o$ | $V_o/V$ | $V_o$ | $V_o/V$ | $V_o$ | $V_o/V$ |
| 1 | 73 | 0 | 27 | 280 | 2.9 | 45 | 6.1 | 375 | 2.6 | 60 | 7.4 |
| 2 | 51 | 24 | 25 | 205 | 2.4 | 50 | 7.3 | 335 | 2.2 | 95 | 7.8 |
| 3 | 32 | 44 | 24 | 290 | 2.1 | 80 | 4.6 | 400 | 1.8 | 180 | 5.8 |
| 4 | 22 | 55 | 23 | 310 | 1.9 | 140 | 3.0 | 435 | 1.8 | 270 | 3.3 |
| 5 | 0 | 79 | 21 | 160 | 2.4 | 100 | 4.9 | 250 | 2.1 | 175 | 4.8 |

[a] Coat-weight of dielectric film.

Regarding Table I, the most desired ratio of $V_o/V$ is 1, showing perfect charge retention. However, it is clear that various blends of polymers and epoxy resins are

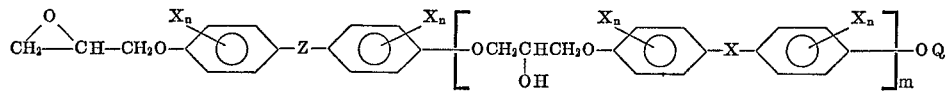

superior in both initial charging and charge retention over either alone, it being understood that optimum ratios of the two may easily be determined for various humidity conditions and coat weights.

The ability of a dielectric coating to accept and retain a charge ultimately is judged by print contrast on a toned sheet. The contrasts of the dielectric composition of the instant invention was measured by a microscope, which allowed small areas (~1.4 mm.²) to be observed. A light meter was used to measure the reflected light from these areas through the microscope. The sample was illuminated with light at a 60° angle of incidence, and the observed light was normal to the surface.

High contrast is desirable and corresponds to a density difference ($\Delta D$) of 1 unit where $\Delta D = \log_{10} I_0 - \log_{10} I$, where $I_0$ and $I$ are light from an unprinted area and light from a solid printed area respectively. A high quality print has a $\Delta D$ value of around 1, while a $\Delta D$ value of 0.1 becomes difficult to read and appears washed out.

Test prints were also visually inspected, compared and rated excellent (E), good (G), fair (F) or poor (P) according to their uniformity of toning.

Each test was carried out on a print which had been immediately toned (0 min.) and toned 30 minutes after charging (30 min.), and at 50 and 80% relative humidities. However, regarding the results below, it is to be understood that the comparisons must be made bearing in mind the difference in coat weights. Lithopone was used as pigment, the amounts being shown in the table.

viscosity of between about 1.2 and 3.5 for a 1% tetrahydrofuran solution at 25° C.;

(B) 8 to 77 volume percent of an epoxy resin having an epoxy equivalent weight of about 400 to 60,000, said epoxy resin being of the formula

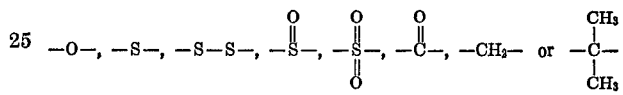

wherein each —Z— is a chemical bond, $$-O-, -S-, -S-S-, -\overset{O}{\underset{\|}{S}}-, -\overset{O}{\underset{\|}{\underset{\|}{S}}}-, -\overset{O}{\underset{\|}{C}}-, -CH_2- \text{ or } -\overset{CH_3}{\underset{CH_3}{C}}-$$

Q is

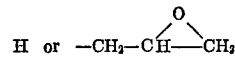

each X is Cl or Br; each n is 0 to 2; and m is about 1 to 210; and (C) 0 to 42 volume percent of a pigment.

2. The composition of claim 1 comprising 32 to 58 volume percent of copolymer, 24 to 50 volume percent of epoxy resin and 10 to 25 volume percent of pigment.

3. The composition of claim 1 wherein said coating is present at from 1 to 15 lbs./ream.

4. The composition of claim 2 wherein the copolymer is from 75 to 95 weight percent vinylidene chloride and 5 to 25 weight percent vinyl chloride or acrylonitrile.

5. The composition of claim 2 wherein, in (B), Z is isopropylidene, Q is 2,3-epoxypropyl and the epoxy equivalent weight is about 200 to 6000.

6. The composition of claim 2 wherein the pigment is lithopone.

| | Volume percent | | | | Print quality | | | | | | | |
|---|---|---|---|---|---|---|---|---|---|---|---|---|
| | | | | | 50% R.H. | | | | 80% R.H. | | | |
| | | | | | Density | | Uniformity | | Density | | Uniformity | |
| | Polymer | Epoxy | Pigment | Coat weight | 0 min. | 30 min. | 0 min. | 30 min. | 0 min. | 30 min. | 0 min. | 30 min. |
| 1 | 73 | 0 | 27 | 7.7 | 0.8 | 0.4 | E | E | 0.5 | 0.2 | P | P |
| 2 | 51 | 25 | 25 | 8.8 | 0.9 | 0.4 | E | E | 0.8 | 0.2 | G | F |
| 3 | 43 | 32 | 25 | 8.9 | 1.2 | 0.7 | E | E | 0.6 | 0.5 | G | F |
| 4 | 32 | 44 | 24 | 6.7 | 1.2 | 0.7 | E | E | 0.7 | 0.4 | F | P |
| 5 | 22 | 55 | 23 | 7.5 | 1.0 | 0.7 | G | G | 0.7 | 0.2 | P | P |
| 6 | 0 | 79 | 21 | 7.5 | 0.7 | 0.6 | P | F | 0.2 | 0.1 | P | P |

It is apparent from the above that, particularly at high (i.e., 80%) humidities, the blends of polymer and epoxy of this invention are superior to either alone.

We claim:

1. A dielectric composition for coating electrographic paper used in electrostatic printing consisting essentially of:

(A) 15 to 85 volume percent of a copolymer of 70 to 96 weight percent vinylidene chloride, the remainder being at least one other olefinically unsaturated co-monomer polymerizable therewith, said copolymer having a molecular weight described by a relative

References Cited

UNITED STATES PATENTS

| 3,236,683 | 2/1966 | Berenbaum et al. | 260—836 X |
| 3,183,281 | 5/1965 | Clemens | 260—837 R |
| 3,008,914 | 11/1961 | Fry | 260—837 X |

OTHER REFERENCES

Condensed Chemical Dictionary, 7th ed., Reinhold Pub. Corp., 1966, pp. 565–566.

LEWIS T. JACOBS, Primary Examiner

U.S. Cl. X.R.

260—32.6, 32.8 R, 32.8 Ep, 37 Ep, 837